T. F. BUTZEN.
TOOTHED GEAR.
APPLICATION FILED JULY 20, 1920.
1,386,089.
Patented Aug. 2, 1921.
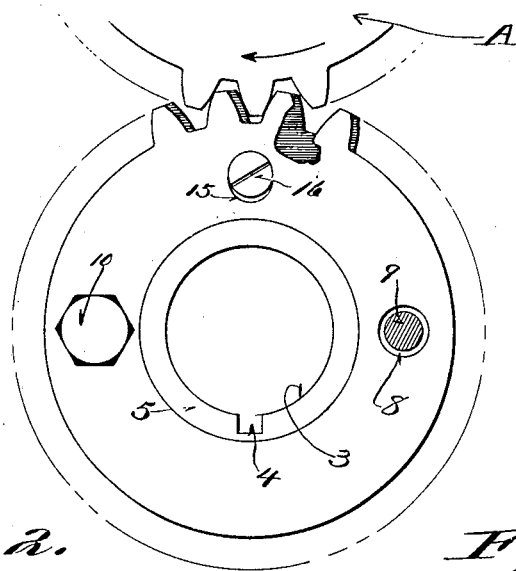
Fig. 1
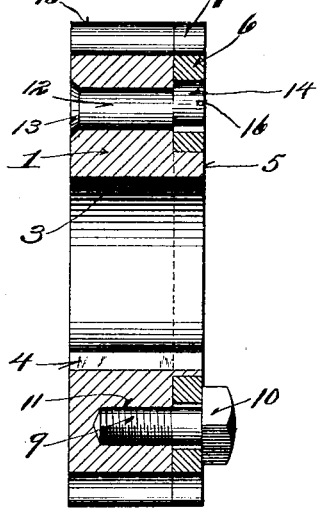
Fig. 2.
Fig. 3.
Inventor
T. F. Butzen

UNITED STATES PATENT OFFICE.

THOMAS FRANK BUTZEN, OF MADISON, WISCONSIN, ASSIGNOR OF ONE-HALF TO DUDLEY MONTGOMERY, OF MADISON, WISCONSIN.

TOOTHED GEAR.

1,386,089.  Specification of Letters Patent.  Patented Aug. 2, 1921.

Application filed July 20, 1920. Serial No. 397,578.

*To all whom it may concern:*

Be it known that I, THOMAS FRANK BUTZEN, a citizen of the United States, and resident of Madison, in the county of Dane and State of Wisconsin, have invented certain new and useful Improvements in Toothed Gears; and I do hereby declare that the following is a full, clear, and exact description thereof.

My present invention relates to new and useful improvements in gears or similar toothed machine elements.

Obviously after more or less wear, the teeth of intermeshing gears or other toothed elements are reduced in size so that there is an unnecessary amount of play with the result that back-lash and rattling occurs. This is not only detrimental to effective operation of the toothed elements, but is a serious annoyance, especially when said parts are used in automobiles and other vehicles. It is therefore the primary object of this invention to provide a compensating means to take up wear and prevent back-lash and rattling in gears and other toothed machine elements.

With this general object in view, the invention resides in the novel features of construction, combination and arrangement of parts which will be hereinafter more particularly described and claimed.

In the accompanying drawing:

Figure 1 represents an elevational view of a pair of intermeshing gears, one of the same being constructed in accordance with my invention.

Fig. 2 is a transverse or axial section, and

Fig. 3 is a detail edge view of a portion of a gear or other toothed element constructed in accordance with the invention.

Referring more particularly to the drawing, in which the invention is shown as embodied in a spur gear, it will be seen that the reference character 1 denotes a gear body section having peripheral teeth 2 and a central shaft receiving hole 3. In the wall of the hole is a key-way 4 by means of which the gear can be splined upon a suitable shaft.

One side of the body section 1 is provided with a hub 5 surrounding the hole 3 on which is rotatably mounted a circular plate 6 having teeth 7 on its periphery which may be alined or disalined with the teeth 2. From Fig. 2 it will be seen that the plate 6 abuts one face of the body section 1 and snugly engages the annular wall of the hub 5 whereby to provide a take-up section for coöperation with said body section. The plate 6 is provided with a pair of diametrically opposed relatively large bolt receiving holes 8 which extend therethrough and receive the shanks 9 of bolts, the heads 10 of which engage the outer face thereof. Said shanks 9 are threaded into sockets 11 in the body section 1 and serve to rigidly secure the take-up section to the body section and to permit a limited circumferential movement of one of the sections with respect to the other when loosened. In other words, when the bolt heads 10 do not tightly engage the plate 6, the same may be oscillated to disaline the teeth 7 with the teeth 2 as shown both in Figs. 1 and 3.

Accurate and slight adjustment of the take-up section with respect to the body section is readily procurable in the present instance by the use of an eccentric. As shown this includes a pin 12 journally mounted in an opening in the body section, one end of which is upset as at 13, whereas its other end carries an eccentric head 14. The latter is located in an oval shaped hole 15 in the plate 6 and is provided with a screw driver kerf 16 to permit ready rotation thereof and the pin 12.

When the teeth of the gear A or the teeth 2 have become worn to such an extent that back-lash or rattling occurs, the bolts, including the shanks 9 and heads 10, are loosened and the pin 12 rotated a necessary extent in a predetermined direction to shift the teeth 7 out of alinement with the teeth 2 as shown in Fig. 1. After the necessary adjustment has been made, the bolts are again tightened and the take-up section rigidly secured to the body section 1. As a result of such construction take-up can be quickly and easily made at will.

Various changes may be made in the forms and proportions of the different parts of the invention without departing from the principles thereof or sacrificing any of its advantages.

I claim:

In a toothed element, a toothed body section, a toothed take up section movable with respect to the body section and having an opening therethrough, a pin journaled in the body section, an eccentric head on one end of the pin and disposed in the opening of the take up section, said head having a kerf for a screw driver and accessible from the outer side of the toothed section, the other end of the pin being upset and countersunk in the body section whereby to frictionally hold it against accidental rotation, said take up section being oscillated with respect to the body section when the pin is rotated, whereby to aline or disaline the teeth of the section.

In testimony that I claim the foregoing I have hereunto set my hand at Milwaukee, in the county of Milwaukee and State of Wisconsin.

THOMAS FRANK BUTZEN.